Oct. 9, 1973 J. B. OLSON 3,764,445
INTERLAYER STRESS REDUCTION IN LAMINATED TRANSPARENCIES
Filed Feb. 2, 1971

INVENTOR
JAN B. OLSON
BY
Lyon & Lyon
ATTORNEYS

United States Patent Office 3,764,445
Patented Oct. 9, 1973

3,764,445
INTERLAYER STRESS REDUCTION IN
LAMINATED TRANSPARENCIES
Jan B. Olson, Marina Del Rey, Calif., assignor to The
Sierracin Corporation, Sylmar, Calif.
Continuation-in-part of abandoned application Ser. No.
790,219, Jan. 10, 1969. This application Feb. 2, 1971,
Ser. No. 111,993
Int. Cl. B32b 3/02, 17/10
U.S. Cl. 161—4                                6 Claims

ABSTRACT OF THE DISCLOSURE

Described herein are coherent laminated transparencies wherein the incidence of edge delamination and chip pulling is reduced by providing in the interlayer film of which the transparency is comprised an unlaminated plane extending inwardly from the edge of the laminate, a barrier film adhered to the interlayer film lining the unlaminated plane and defining the walls thereof. The barrier film resists the passage of moisture therethrough from the edge of the laminate to the interior thereof and is sufficiently adhered to the interlayer film as to resist, in operation, passage of moisture to the interior of the laminate along the barrier film-interlayer film interface. Accordingly high edge tensile stress is reduced without providing a potential leak path in the laminate.

CROSS REFERENCE TO RELATED APPLICATION

This is a continuation-in-part of my copending application Ser. No. 790,219, filed Jan. 10, 1969 and now abandoned.

BACKGROUND OF THE INVENTION

When dissimilar material such as glass and polymethylmethacrylate are laminated at elevated temperatures with an interlayer film, the difference in coefficients of expansion of the dissimilar materials establishes a stress within the interlayer. The same phenomenon occurs when previously laminated, albeit similar materials are formed to a radius of curvature. This residual stress within the interlayer is primarily a shear stress in the interior of the laminate, with only a small tensile component. However, at the edge of the interlayer, the tensile stress increases sharply. Because it is of the edge of a bond, this high level tensile stress is a peel force to which the interlayer bond has little resistance. When the stress is sufficiently high or the bond strength sufficiently low, this condition manifests itself as edge delamination. Another common failure is chip pulling which is attributable to this high edge tensile stress when the exterior ply is a brittle material such as glass and the bond strength is high. It has previously been proposed to transfer the high edge stress to an inward area where it neither represents peel force nor provides access to edges from which chips can be pulled. In Worrall, U.S. Pat. No. 2,991,209 it is proposed that an unlaminated zone be provided in proximity to the laminate edge by employing a parting strip which is non-adherent to the interlayer film. Similarly, Orcutt U.S. Pat. No. 3,424,642 and Miller U.S. Pat. No. 2,991,207 incorporate in the interlayer film parting strips which are but weakly adhered to the interlayer film so that high tensile edge stress experienced in operation acts along the interlayer-parting strip interface to form an unlaminated zone rather than along the interlayer-exterior ply interface with consequent edge delamination or chip pulling. While the configurations of the prior art have proved generally satisfactory in dissipating high tensile edge stress, each of them have, by providing unlaminated or delaminable zones near the edge, created a potential leak path for moisture and plasticizer. Thus, a need has existed for a means of relieving edge stress without creating any leak path.

SUMMARY OF THE INVENTION

By this invention there is provided a coherent laminated transparency comprising rigid dielectric plies having an interlayer film therebetween and normally subject in operation to damage from high edge tensile stress, an improvement whereby edge stress is reduced which comprises providing in at least a portion of the interlayer an unlaminated plane extending inwardly from the edge thereof, a barrier film adhered to the interlayer film lining the unlaminated plane and defining the walls thereof, in operation the barrier film resisting the passage of moisture therethrough from the edge to the interior of the laminate along the unlaminated plane and being sufficiently adhered to the interlayer film as to resist passage of moisture to the interior of the laminate along the barrier film-interlayer film interface.

In a preferred embodiment of the present invention, the unlaminated plane at the edge of the laminate is lined with a folded-over moisture impervious plastic film.

One object of the invention is to provide a novel means for relief from high tensile edge stress in laminates without creation of a leak path.

This and other objects and advantages of the invention will be apparent from the more detailed description which follows, and from the attached drawing in which.

DETAILED DESCRIPTION OF THE INVENTION

Figure 1:
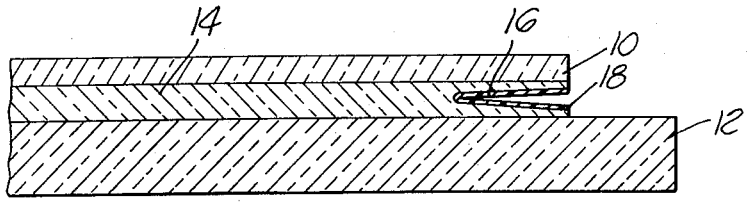
FIG. 1 is a sectioned elevation of one embodiment of the laminate of this invention.
Figure 2:
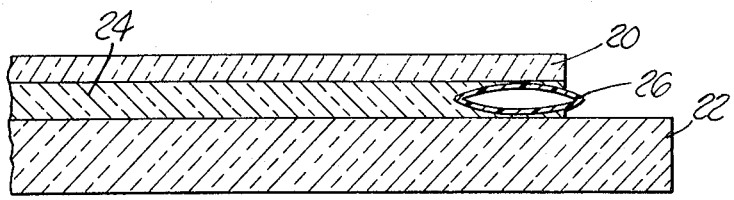
FIG. 2 is a sectioned elevation of another embodiment of the laminated transparency of this invention.

With reference now to the drawings, layer 10 in FIG. 1 is a transparent rigid dielectric ply having, for example, a low coefficient of expansion, layer 12 is a second rigid, transparent dielectric ply having a high coefficient of expansion, and layer 14 is an interlayer film. The unlaminated plane at the edge is provided, in this example, by a notch 16 lying therein, a barrier film 18 being adhered to interlayer film 14, lining the unlaminated plane and defining the walls thereof. In FIG. 2, transparent, rigid dielectric plies 20 and 22 are separated by interlayer film 24. In this case, the unlaminated plane is lined by flexible, moisture resistant plastic tubing 26 which defines the walls thereof.

Figure 3:
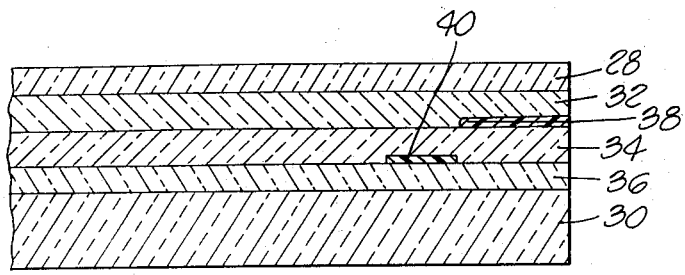
FIG. 3 is a sectioned elevation of a preferred embodiment of the present invention.
Figure 4:
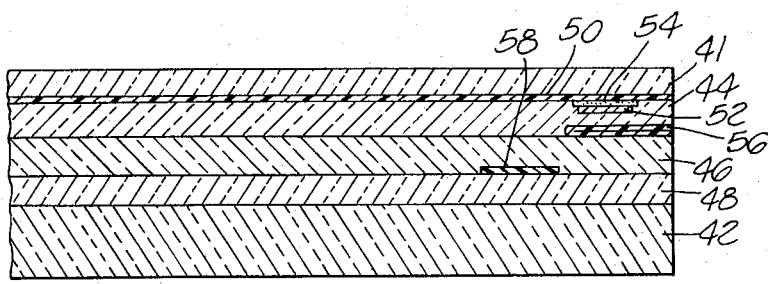
FIG. 4 is a sectioned elevation of yet another preferred embodiment of the present invention.

In the embodiments of FIGS. 1 and 2, the barrier films are most conveniently inserted after lamination of the interlayer film to the rigid exterior plies. In such case, the possibility that the barrier film walls defining the unlaminated plane will be adhered one to the other under conditions of interlayer-exterior ply lamination does not arise. In the embodiments of FIGS. 3 and 4, on the other hand, individual interlayer films are not notched but rather the barrier film is disposed between individual interlayer films and the interlayer film-exterior ply lay-up then laminated. In this case, the barrier film is preferably formed of material which does not adhere to itself under conditions of lamination or, alternatively, the faces of the barrier film presented to one another upon insertion can be treated with a conventional silicone or other parting agent. Upon lamination or, in particular instances, by the provision of adhesive at the interlayer film-barrier film interface, the barrier film is adhered to the interlayer film but not to itself, so that an unlaminated plane remains at the edge of the ultimate laminate.

Thus, in FIG. 3, the transparent rigid layers 28 and 30 are joined by three sheets of interlayer material 32, 34 and 36. The unlaminated plane is provided by the folded-over piece of moisture resistant barrier film 38. It will be understood, of course, that while the individual interlayer films 32, 34 and 36 are depicted as discrete laminae, upon lamination an overall interlayer is formed by bonding of the individual interlayers, one to the other.

While not in any way essential to this invention, the laminated transparency can also be provided with an internal separator 40, which is simply a sheet of plastic film such as cellophane to which the interlayer material does not adhere. The separator 40 functions to further transfer stress inwardly of the lamination and minimize the hazard of edge delamination.

FIG. 4 shows an embodiment which is generally similar to FIG. 3 except that it is of the electrically heated variety. The transparent, rigid dielectric layers 41 and 42 are separated by an interlayer formed from three individual interlayer films 44, 46 and 48. Layer 41 is coated with an electrically conductive coating 50. Bus bar 52 is joined to coating 50 by conductive adhesive 54. The unlaminated plane created by the folded-over barrier film 56 functions as previously described. This embodiment may, of course, also be provided with an internal separator 58.

The moisture resistant barrier film can be formed from any material having a low water vapor transmission and sufficiently adherable to the interlayer material as to resist in operation passage of moisture along the barrier film-interlayer film interface. Among the many such materials familiar to those skilled in the art can be mentioned polyethylene terephthalate polyester films, such as Mylar, fluorinated films like fluorinated ethylene-propylene copolymer (Teflon FEP), polytrifluorochloroethylene copolymer and vinylidene chloride-vinyl chloride copolymer films. Preferably, although not necessarily, an adhesive is employed to secure the barrier film to the interlayer film material. For example, in a preferred case wherein the barrier film is a polyethylene terephthalate polyester film, adhesives which can optionally be employed include polyester adhesives (e.g., Nos. 46950, 46971 and 49690 in Du Pont Technical Bulletin No. 17—"Polyester Adhesives"), polyamide resin adhesives, baking phenolic adhesives, and a wide variety of vinyl resin-based adhesives used in safety glass construction industry. The barrier films can be provided with a thin, solvent-dispersed layer of vinyl on that face which will be presented to the interlayer film, so that the necessary adhesion arises from fusion with, e.g., a polyvinyl butyral interlayer film. Moreover, as will be apparent to the art-skilled, the barrier film configurations of the invention can be bonded without adhesive to polymerizing interlayers, e.g., epoxy or silicone resin interlayers which are "cast in place." Barrier films can, in particular instances, be pretreated by conventional techniques to enhance their adherability to the interlayer. Thus, Teflon FEP films are conventionally pretreated by glow discharge, immersion in sodium-liquid ammonia solution or in sodium naphthalene solutions, (See U.S. Pat. 2,809,130 to Rappaport). Polyethylene terephthalate polyester barrier films can be subjected to glow discharge, hot alkaline solution (see U.S. Pat. No. 2,837,454 to Watkins et al.) or flame treatment (e.g., British Pat. No. 828,381 to Gore et al). In every case, all that is required is that the barrier film be sufficiently adhered to the interlayer film as to resist in operation passage of moisture along the barrier film-interlayer film interface.

The exterior plies of the laminated transparencies formed according to the invention are of rigid, transparent dielectric glass or plastic material such as, in the case of glass, soda glass; and in the case of plastic, polycarbonate plies, polysulfone plies or plies of polymethylmethacrylate (as cast or biaxially stretched). Where one or more of the rigid, dielectric plies is glass, it is preferred that chemically tempered glass be employed. While the present invention is particularly applicable to the joining of plastic (e.g., biaxially stretched polymethylmethacrylate) plies to glass, it is also applicable to the joining of any two rigid transparent materials and particularly to any such materials which are substantially dissimilar in their thermal expansion properties. The manner and means of laminating such plies with an interlayer film-containing laminate are well known to those skilled in the safety glass type construction industry and form no part of this invention. Suffice it to say that such lamination is time, temperature and pressure dependent and is normally performed at elevated temperatures and pressures, e.g., when the interlayer film is polyvinyl butyral and the rigid ply glass, it can be laminated to the rigid plies by exposure to 200 p.s.i. at 275° F. for approximately one hour. When the rigid plies are of biaxially stretched polymethyl methacrylate, lamination typically has been effected at about 225° F., 200 p.s.i. over about two hours. When the rigid ply is "as cast" polymethyl methacrylate, lamination can be achieved at, e.g., 240° F., 200 p.s.i. over the course of about one hour.

"Transparent" refers to that property of a material or structure which admits of the transmission of visible light without appreciable scattering such that objects beyond are clearly visible. Preferably, materials are chosen such that the formed laminated transparencies transmit at least 70% of incident light. Of course, in architectural and other employments where light transmission is not critical, transmission can be as low as e.g., 5%.

The term "interlayer film" as used herein refers to a film having rheological properties which permit optional texturing of its outer surface for deaeration during subsequent heat and pressure lamination, the textured substance becoming smooth during such lamination such that the resulting laminate is transparent; the material having bond strength to the rigid glass and plastic plies of the invention adequate to the purposes thereof. Typical candidates for interlayer employment include polyurethane, polyvinyl butyral, polyvinyl acetal, and polyvinyl chloride films. The interlayer materials are generally, but in particular instances need not be, plasticized with, e.g., plasticizers such as dioctyl phthalate, tricresol phosphate, dibutyl phthalate, dibutyl sebacate (DBS), triethylene glycol di-(2-ethyl-butyrate) commonly known as 3GH, as well as other conventional, e.g., alkyl phthalate or alkyl ester plasticizers. Plasticizing compounds are chosen according, primarily, to two criteria—mutual solubility or miscibility with the material plasticized (i.e., compatibility) and a boiling point sufficiently high as to prevent outgassing at temperatures experienced in manufacture and operation of the ultimate laminate. They are conventionally employed in proportions ranging from about 5% to 65% by weight of the plasticized material. Naturally, elongation and tensile strength of the interlayer material are influenced by the amount of plasticizer employed. Elongation capability of the interlayer film, of course, influences the so-called "head catch" capability thereof in employments such as interlayers in vehicle windshields. In the most general sense, interlayers employed in this invention have an ultimate elongation greater than about 150% and tensile strength less than about 6500 p.s.i., preferably less than about 5000 p.s.i. For example, polyvinyl butyral plasticized with 21% by weight of 3GH exhibits a tensile strength of 4750 p.s.i. and ultimate elongation of 200%; with 37.5% by weight DBS, tensile strength is 3050 p.s.i. and ultimate elongation 250%. Polyurethanes employed have displayed tensile strengths ranging from 4500 to 6500 p.s.i. and ultimate elongation ranging from 400% to 480%. Plasticized polyvinyl chloride ranges in tensile strength from about 1400 to 5600 p.s.i. and in ultimate elongation from 150% to 500%.

Generally, the unlaminated plane should be at least about 0.1 inch in depth for avoidance of chip pulling. Preferably, then, the unlaminated film ranges in depth from about 0.1 to about 1.5 inch or more, most preferably from about 0.6 to about 1.5 inches.

From the foregoing, it will be apparent that the present invention represents a significant advance in the development of laminated transparencies, by the practice of this invention, high tensile edge stress is relieved without generation of a potential leak path from the edge of formed laminates to their interior.

Having fully described the invention, it is intended that it be limited only by the lawful scope of the appended claims.

I claim:

1. In a coherent laminated article comprising rigid dielectric plies having an interlayer film therebetween and normally subject in operation to damage from high edge tensile stress, the improvement whereby edge stress is reduced wherein an unlaminated plane extends inwardly from an edge of said interlayer film, said plane being bounded within said interlayer film by a barrier film adhered to said interlayer film, in operation said barrier film resisting the passage of moisture therethrough from said edge along said plane to beyond said point and being sufficiently adhered to said interlayer film as to resist passage of moisture to the interior of said article along the barrier film-interlayer film interface, said article being transparent to light incident thereon in a direction normal to the plane of interlayer film-rigid ply lamination.

2. The laminated article of claim 1 wherein one of said rigid plies is glass and wherein the other is plastic.

3. The laminated article of claim 2 wherein said plastic ply is polymethylmethacrylate.

4. A laminated article according to claim 2 wherein said barrier film is selected from the group consisting of fluorinated ethylene-propylene copolymer and polyethylene terephthalate polyester films and wherein said interlayer film is selected from the group consisting of polyvinyl butyral, polyvinyl chloride and polyurethane films.

5. The laminated article of claim 1 wherein said barrier film is in the form of tubing bounding said unlaminated plane.

6. The laminated article of claim 1 wherein said barrier film is folded over to a "V" configuration open to said edge.

References Cited

UNITED STATES PATENTS

| | | | |
|---|---|---|---|
| 2,991,209 | 7/1961 | Worrall | 161—409 X |
| 3,424,642 | 1/1969 | Orcutt | 161—199 X |
| 3,991,207 | 7/1961 | Miller | 161—165 X |
| 3,171,771 | 3/1965 | Badger, et. al. | 161—44 |
| 2,697,675 | 12/1954 | Gaiser | 161—192 X |
| 3,009,845 | 11/1961 | Wiser | 161—149 X |

GEORGE F. LESMES, Primary Examiner

L. T. KENDELL, Assistant Examiner

U.S. Cl. X.R.

161—1, 44, 139, 149, 183, 190, 192, 199, 203, 408